(12) United States Patent
Fu et al.

(10) Patent No.: US 11,768,345 B2
(45) Date of Patent: Sep. 26, 2023

(54) LENS BARREL AND IMAGING MODULE APPLYING THE SAME

(71) Applicant: GENIUS ELECTRONIC OPTICAL (XIAMEN) CO., LTD., Fujian (CN)

(72) Inventors: Weiwei Fu, Fujian (CN); Changwei Liu, Fujian (CN); Haibin Zhan, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 222 days.

(21) Appl. No.: 17/214,940

(22) Filed: Mar. 29, 2021

(65) Prior Publication Data
US 2022/0236581 A1 Jul. 28, 2022

(30) Foreign Application Priority Data

Jan. 22, 2021 (CN) .......................... 202110090477.3

(51) Int. Cl.
*G02B 7/02* (2021.01)
*G02B 7/08* (2021.01)

(52) U.S. Cl.
CPC ............... *G02B 7/028* (2013.01); *G02B 7/08* (2013.01)

(58) Field of Classification Search
CPC ........................... G02B 7/028; G02B 7/04–102
See application file for complete search history.

(56) References Cited

U.S. PATENT DOCUMENTS

| 2010/0284081 | A1* | 11/2010 | Gutierrez | ................. | G03B 3/10 |
| | | | | | 359/554 |
| 2014/0340771 | A1* | 11/2014 | Wakabayashi | ......... | G02B 7/028 |
| | | | | | 359/820 |
| 2017/0160514 | A1* | 6/2017 | Tomura | .................... | G03B 3/10 |

FOREIGN PATENT DOCUMENTS

| CN | 109669252 A | * | 4/2019 | ............. G02B 7/022 |
| JP | 2014219503 A | * | 11/2014 | |

OTHER PUBLICATIONS

Machine translation of JP2014219503A retrieved electronically from Espacenet Jan. 19, 2023 (Year: 2023).*
Machine translation of CN 109669252A retrieved electronically from Espacenet Jan. 19, 2023 (Year: 2023).*

* cited by examiner

*Primary Examiner* — Cara E Rakowski
(74) *Attorney, Agent, or Firm* — JCIPRNET

(57) ABSTRACT

A lens barrel, including a barrel wall and a sleeve, is provided. The barrel wall extends from an object side to an image side around an optical axis, and has a lens barrel inner surface facing the optical axis and a lens barrel outer surface facing away from the lens barrel inner surface. The lens barrel outer surface includes a lens barrel object-side surface facing the object side. The sleeve is fixed on the lens barrel outer surface and partially embedded in the barrel wall. The sleeve has an object-side end closest to the object side and an image-side end closest to the image side. The object-side end does not extend beyond the lens barrel object-side surface not covered by the sleeve and closest to the object-side end in a direction parallel to the optical axis.

18 Claims, 8 Drawing Sheets

LENS BARREL AND IMAGING MODULE APPLYING THE SAME

CROSS-REFERENCE TO RELATED APPLICATION

This application claims the priority benefit of China application serial no. 202110090477.3, filed on Jan. 22, 2021. The entirety of the above-mentioned patent application is hereby incorporated by reference herein and made a part of this specification.

BACKGROUND

Technical Field

The invention relates to an optical mechanism element, and particularly relates to a lens barrel and an imaging module using the lens barrel.

Description of Related Art

Generally, in an optical imaging lens, an actuator such as a voice coil motor (VCM) is fixed on a barrel wall of a lens barrel to achieve a purpose of focusing or focus adjustment. The actuator needs to be fixed on the barrel wall of the lens barrel by glue through high temperature curing. However, in a process of heating and cooling, the actuator, the glue and the lens barrel all have a phenomenon of first expansion and then contraction. At this time, pulling of the actuator and the glue to the lens barrel may easily cause deformation of the lens barrel, such that the lens barrel and inner lens elements are changed from a tight fit to a loose fit to produce a significant gap, which causes the lens elements to shift or skew and affects an assembly yield.

SUMMARY

The invention is directed to a lens barrel and an imaging module using the lens barrel, where the lens barrel and inner lens elements have a tight fit or better assembly yield, which provides better imaging quality. The lens barrel and the imaging module are adapted to be used to capture images and record videos, and are adapted to be applied to portable electronic devices, such as mobile phones, cameras, tablet PCs, personal digital assistants (PDAs), etc.

An embodiment of the invention provides a lens barrel including a barrel wall and a sleeve. The barrel wall extends from an object side to an image side around an optical axis. The barrel wall has a lens barrel inner surface facing the optical axis and a lens barrel outer surface facing away from the lens barrel inner surface. The lens barrel outer surface includes a lens barrel object-side surface facing the object side. The sleeve is fixed on the lens barrel outer surface and is partially embedded in the barrel wall. The sleeve has an object-side end closest to the object side and an image-side end closest to the image side. The object-side end does not extend beyond the lens barrel object-side surface that is not covered by the sleeve and closest to the object-side end in a direction parallel to the optical axis, wherein the lens barrel object-side surface that is closest to the object-side end is closer to the object side than the image-side end, and the lens barrel satisfies a following conditional expression: 2.500 S/D 68.000, wherein S is an overall length of the lens barrel along the optical axis, and D is the maximum length of the sleeve in the direction parallel to the optical axis.

An embodiment of the invention provides a lens barrel adapted to cooperate with an actuator. The lens barrel includes a barrel wall and a sleeve. The barrel wall extends from an object side to an image side around an optical axis. The barrel wall has a lens barrel inner surface facing the optical axis and a lens barrel outer surface facing away from the lens barrel inner surface. The sleeve is fixed on the lens barrel outer surface, and the sleeve has a sleeve inner surface facing the optical axis and a sleeve outer surface facing away from the sleeve inner surface. A surface area of the sleeve outer surface is smaller than a surface area of the lens barrel outer surface. The lens barrel satisfies a following conditional expression: $S/Lmax \geq 1.600$, so that the sleeve is adapted to be set within a scope where the lens barrel cooperates with the actuator, so as to reduce a deformation generated after dispensing and curing of the lens barrel and the actuator. S is an overall length of the lens barrel along the optical axis, and Lmax is a distance between a position of the sleeve closest to the object side and a position of the lens barrel closest to the image side along a direction parallel to the optical axis.

An embodiment of the invention provides an imaging module including a lens and an actuator. The lens includes a lens barrel, and the lens barrel includes a barrel wall and a sleeve. The barrel wall extends from an object side to an image side around an optical axis. The barrel wall has a lens barrel inner surface facing the optical axis and a lens barrel outer surface facing away from the lens barrel inner surface. The sleeve is fixed on the lens barrel outer surface, and the sleeve has a sleeve inner surface facing the optical axis and a sleeve outer surface facing away from the sleeve inner surface. A surface area of the sleeve outer surface is smaller than a surface area of the lens barrel outer surface, and at least a part of the sleeve outer surface is bonded to a carrier of the actuator by dispensing and curing.

Based on the above description, beneficial effects of the lens barrel and the imaging module of the embodiment of the invention are that: by fixing the sleeve on the lens barrel outer surface and through the configuration relationship satisfying the aforementioned conditions, the lens barrel and the imaging module of the embodiment of the invention have enhanced lens barrel strength, reduced deformation of the lens barrel and improved assembly yield.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
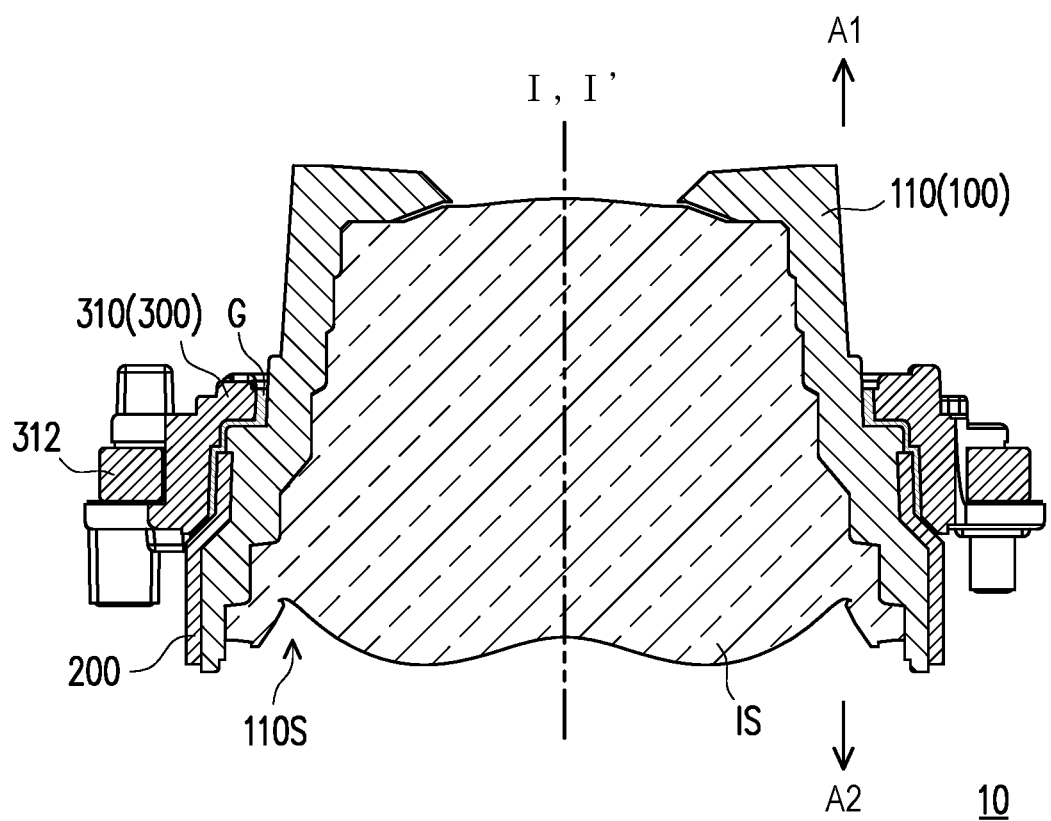
FIG. 1 is a schematic diagram of a lens barrel and an imaging module according to a first embodiment of the invention.
Figure 2A:
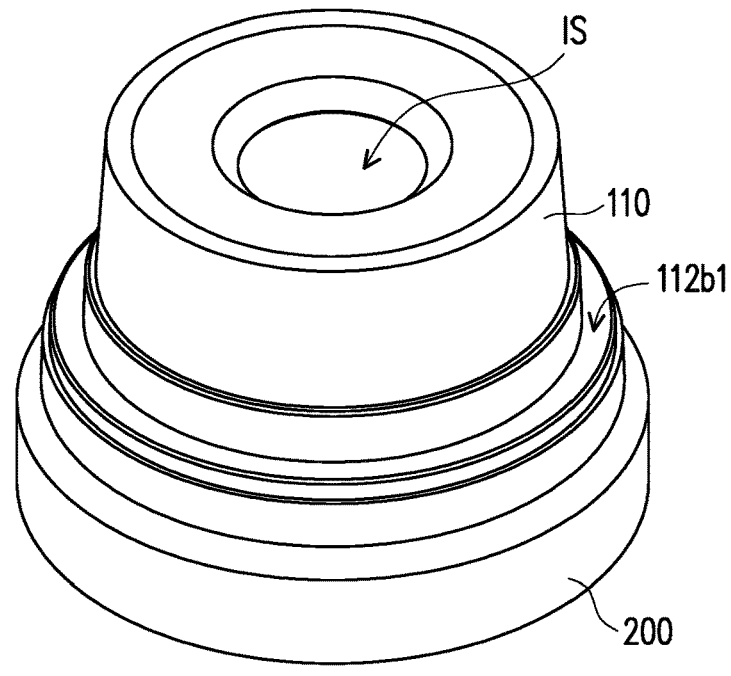
FIG. 2A is a schematic three-dimensional view of the lens barrel of the embodiment of FIG. 1.
Figure 2B:
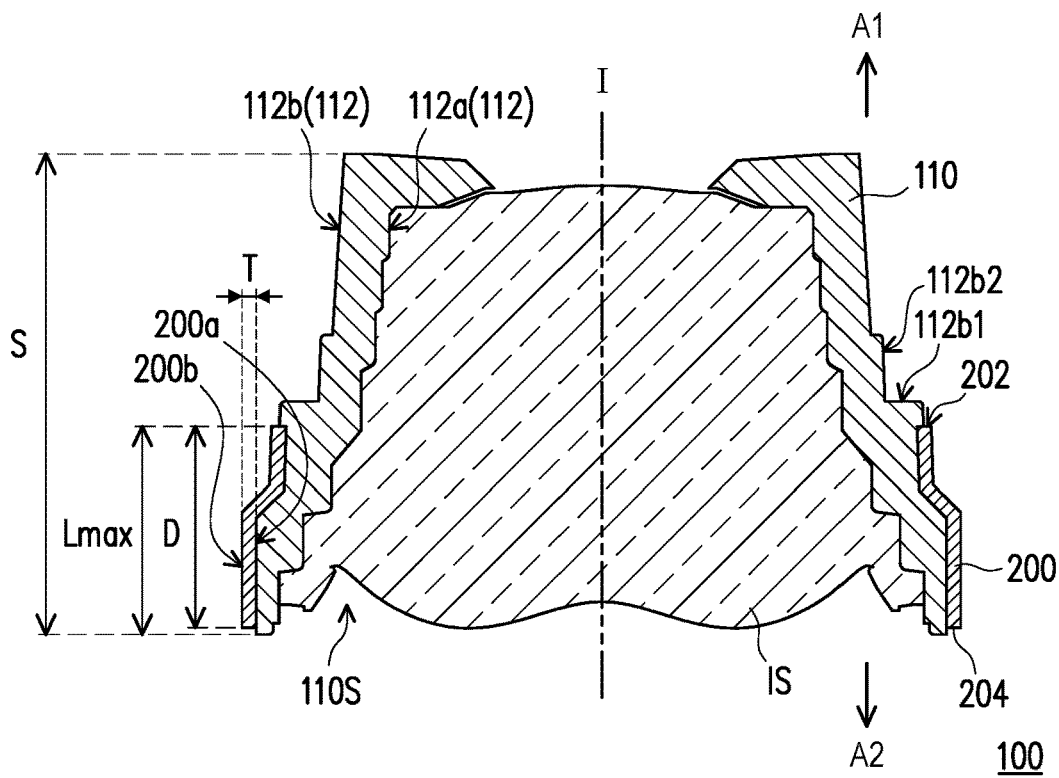
FIG. 2B is a schematic cross-sectional view of the lens barrel of the embodiment of FIG. 1.

FIG. 1 is a schematic diagram of a lens barrel and an imaging module according to a first embodiment of the invention. FIG. 2A is a schematic three-dimensional view of the lens barrel of the embodiment of FIG. 1. FIG. 2B is a schematic cross-sectional view of the lens barrel of the embodiment of FIG. 1.

Referring to FIG. 1, FIG. 2A and FIG. 2B, an imaging module 10 includes a lens 100 and an actuator 300. The lens 100 includes a lens barrel 110. The lens barrel 110 has an accommodation space 1105, and an optical imaging system IS may be disposed in the accommodation space 1105. The optical imaging system IS includes at least one lens element. The optical imaging system IS has an optical axis I, and receives imaging rays incident from an object side A1 from an angle parallel to the optical axis I to a half field of view (HFOV) relative to the optical axis I. The imaging rays pass through the optical imaging system IS and forms an image on an image plane located on an image side A2. The imaging module 10 may further include an image sensor disposed on the image side A2 of the optical imaging system IS, and the image plane of the optical imaging system IS is located on the image sensor.

The lens barrel 110 has a barrel wall 112 and a sleeve 200 around the optical axis I. The barrel wall 112 extends from the object side A1 to the image side A2, and the barrel wall 112 has a lens barrel inner surface 112a facing the optical axis I and a lens barrel outer surface 112b facing away from the lens barrel inner surface 112a.

The sleeve 200 is fixed on the lens barrel outer surface 112b. The sleeve 200 has a sleeve inner surface 200a facing the optical axis I and a sleeve outer surface 200b facing away from the sleeve inner surface 200a. In the embodiment, the sleeve inner surface 200a is attached to the lens barrel outer surface 112b. A surface area of the sleeve outer surface 200b is smaller than a surface area of the lens barrel outer surface 112b. As shown in FIG. 2A and FIG. 2B, the sleeve 200 is disposed on a part of the lens barrel outer surface 112b.

The actuator 300 may be a voice coil motor (VCM) design type or other types of actuator design. The actuator 300 has a carrier 310 arranged along an axis I' and a base body (not shown) arranged around the outside of the carrier 310 along the axis I'. A coil 312 is disposed on the carrier 310, and the coil 312 may interact with a magnetic element arranged at an inner side of the base body to move the carrier 310 relative to the base body along the axis I'. The carrier 310 is arranged around the outside of the lens barrel 110, and the axis I' of the carrier 310 may be coincided with the optical axis I of the optical imaging system IS. At least a part of the sleeve outer surface 200b is bonded to the carrier 310 of the actuator 300 by dispensing and curing, so that the lens barrel 110 and the sleeve 200 are fixedly bonded to the carrier 310. Therefore, the carrier 310 of the actuator 300 may carry the lens barrel 110 and the optical imaging system IS arranged inside the lens barrel 110 to move along the axis I' (the optical axis I), so as to achieve focusing or focus adjustment of an image. In the embodiment, the carrier 310 is also bonded to a part of the lens barrel outer surface 112b by dispensing and curing, so that there is a glue G between the carrier 310 and the sleeve outer surface 200b and the lens barrel outer surface 112b.

Regarding the dispensing and bonding between the lens barrel 110 and the actuator 300, in case of high temperature curing, the lens barrel 110 and the actuator 300 may be first expanded and then contracted. At this time, pulling of the actuator 300 on the lens barrel outer surface 112b and the glue G to the lens barrel 110 in a radial direction away from the optical axis I may easily cause deformation of the lens barrel 110. By fixing the sleeve 200 on the lens barrel outer surface 112b, such deformation may be reduced. Therefore, the imaging module and the lens barrel of the embodiment of the invention may mitigate the problem of deformation after dispensing and bonding of the lens barrel and the actuator.

Referring to FIG. 1 to FIG. 2B, in another aspect of the invention, the lens barrel 110 and the actuator 300 are adapted to cooperate with and have a better cooperating position with each other. The lens barrel 110 includes the barrel wall 112 and the sleeve 200. The lens barrel 110 has the accommodation space 1105, and the optical imaging system IS may be disposed in the accommodation space 1105. The optical imaging system IS has the optical axis I, and receives imaging rays incident from the object side A1, and the imaging rays pass through the optical imaging system IS to form an image on the image side A2. The barrel wall 112 surrounds the optical axis I and extends from the object side A1 to the image side A2. The barrel wall 112 has the lens barrel inner surface 112a facing the optical axis I and the lens barrel outer surface 112b facing away from the lens barrel inner surface 112a.

The lens barrel outer surface 112b includes a lens barrel object-side surface 112b1 facing the object side A1. Referring to FIG. 2B, the lens barrel outer surface 112b may be in a step shape, where the lens barrel outer surface 112b facing the object side A1 is the lens barrel object-side surface 112b1. In detail, the lens barrel outer surface 112b may include the lens barrel object-side surface 112b1 that is substantially orthogonal to the optical axis I, and a lens barrel external surface 112b2 extending substantially in a direction parallel to the optical axis I on a cross-section including the optical axis I (for example, the cross-section shown in FIG. 2B). However, in some embodiments of the invention, as shown in FIG. 2B, on the cross-section that includes the optical axis I, an extension line of the lens barrel external surface 112b2 may include an angle with the optical axis I in the direction of the object side A1, so that the lens barrel external surface 112b2 presents a tapered surface that gradually tapers toward the object side A1.

The sleeve 200 is fixed on the lens barrel outer surface 112b. In other words, the sleeve 200 is fixed relative to the lens barrel 110, and the sleeve 200 and the lens barrel 110 cannot move relative to each other, and the sleeve inner surface 200a is in full contact with the lens barrel 110. As shown in FIG. 2B, in the embodiment, the sleeve 200 is not embedded in the lens barrel outer surface 112b, but is fixed on the lens barrel outer surface 112b at a lens barrel inward contraction section, but the invention is not limited thereto. In other embodiments, the lens barrel outer surface configured with the sleeve may not have an inward contraction section. In some other embodiments, in order not to be fixed by other glues, the sleeve may be selectively partially embedded in the lens barrel outer surface to improve firmness between the sleeve and the barrel wall. In addition, in the embodiment, the lens barrel 110 satisfies a following conditional expression: S/Lmax≥1.600, where S is an overall length of the lens barrel 110 along the direction of the optical axis I, and Lmax is a distance between a position of the sleeve 200 closest to the object side A1 and a position of the lens barrel 110 closest to the image side A2 along a direction parallel to the optical axis I. In this way, the sleeve 200 may be set within a scope where the lens barrel 110 cooperates with the actuator 300 (for example, glue dispensing between the actuator 300 and the lens barrel 110 may be performed at a position closer to a middle section of the lens barrel 110), so as to increase a lens barrel strength of the lens barrel 110 within a cooperating range with the actuator 300, reduce the influence that the actuator 300 and the glue pull the lens barrel in a direction away from the optical axis, and reduce deformation generated after dispensing and curing of the lens barrel 110 and the actuator 300, where a preferable range of S/Lmax is 1.600≤S/Lmax≤11.500, and a more preferable range is 2.000≤S/Lmax≤5.000. In the embodiment, the sleeve 200 is partially set within the range that the lens barrel 110 and the actuator 300 cooperate with each, but in other embodiments, the sleeve may also be fully disposed within the cooperating range.

In addition, in the embodiment, the lens barrel 110 satisfies the following conditional expression: 2.500≤S/D≤68.000 where S is the overall length of the lens barrel 110 along the optical axis I, and D is the maximum length of the sleeve 200 in the direction parallel to the optical axis I. By satisfying 2.500≤S/D≤68.000, the effect of reducing the deformation of the lens barrel 110 is achieved, and the difficulty of bonding the sleeve 200 with the lens barrel outer surface 112b during molding of the lens barrel 110 is reduced, and the cost may be saved. The sleeve 200 has an object-side end 202 closest to the object side A1 and an image-side end 204 closest to the image side A2. In the embodiment, the object-side end does not extend beyond the lens barrel object-side surface 112b1 that is not covered by the sleeve 200 and closest to the object-side end 202 in a direction parallel to the optical axis I, where the lens barrel object-side surface 112b1 that is closest to the object-side end 202 is closer to the object side A1 than the image-side end 204. Referring to FIG. 2B, the lens barrel outer surface 112b may have a stepped structure, so that the lens barrel outer surface 112b has a series of lens barrel object-side surfaces 112b1 arranged from the object side A1 to the image side A2. Among the lens barrel object-side surfaces 112b1 that are not covered by the sleeve 200, there is a lens barrel object-side surface 112b1 closest to the object-side end 202. Such lens barrel object-side surface 112b1 is closer to the object side A1 than the image-side end 204 of the sleeve 200, and the object-side end 202 of the sleeve 200 does not extend beyond such lens barrel object-side surface 112b1 in the direction parallel to the optical axis I. In other words, the sleeve 200 does not extend beyond such lens barrel object-side surface 112b1 in the direction toward the object side A1. When the lens barrel 110 satisfies 2.500≤S/D≤68.000, in collaboration with the design that the sleeve 200 is fixed on the lens barrel outer surface 112b and is partially embedded in the barrel wall 112 and the sleeve 200 does not extend beyond the above lens barrel object-side surface 112b1 in the direction toward the object side A1, the firmness between the sleeve 200 and the barrel wall 112 is enhanced.

In addition, in the embodiment, the lens barrel 110 satisfies the following conditional expression: 0.000<T/D≤10.600, where T is a distance between a position of the sleeve 200 farthest from the optical axis I and the lens barrel outer surface 112b in the direction perpendicular to the optical axis I (in the embodiment, since the sleeve 200 is not embedded in the lens barrel outer surface 112b, T is a thickness of the sleeve 200 at a position farthest from the optical axis I in the direction perpendicular to the optical axis I), and D is the maximum length of the sleeve 200 in the direction parallel to the optical axis I, which may achieve the purpose of mitigating the deformation of the lens barrel 110 while saving the most cost.

In some embodiments of the invention, a material of the sleeve 200 is metal, which may have a better effect of mitigating the deformation of the lens barrel 110, but the invention is not limited thereto. In other embodiments of the invention, the material of the sleeve 200 may be a plastic material with a thermal expansion coefficient smaller than a thermal expansion coefficient of the material of the lens barrel 110 (or the barrel wall 112), which may save the cost and reduce manufacturing difficulty. In some embodiments of the invention, the sleeve 200 is fixed on the lens barrel outer surface 112b of the lens barrel by means of an insert. For example, the pre-molded sleeve 200 may be placed in a manufacturing mold of a body of the lens barrel 110, so that the formed body of lens barrel 110 and the sleeve 200 may be fixedly bonded without using glue or other bonding mechanisms or bonding elements to achieve bonding, but the invention is not limited thereto. To fix the sleeve 200 on the lens barrel outer surface 112b may achieve a position limiting function, so that the sleeve 200 is not easily eccentric when the lens barrel 110 is molded. In addition, to fix the sleeve 200 on the lens barrel outer surface 112b in the manner of an insert may enhance the firmness.

Figure 3A:
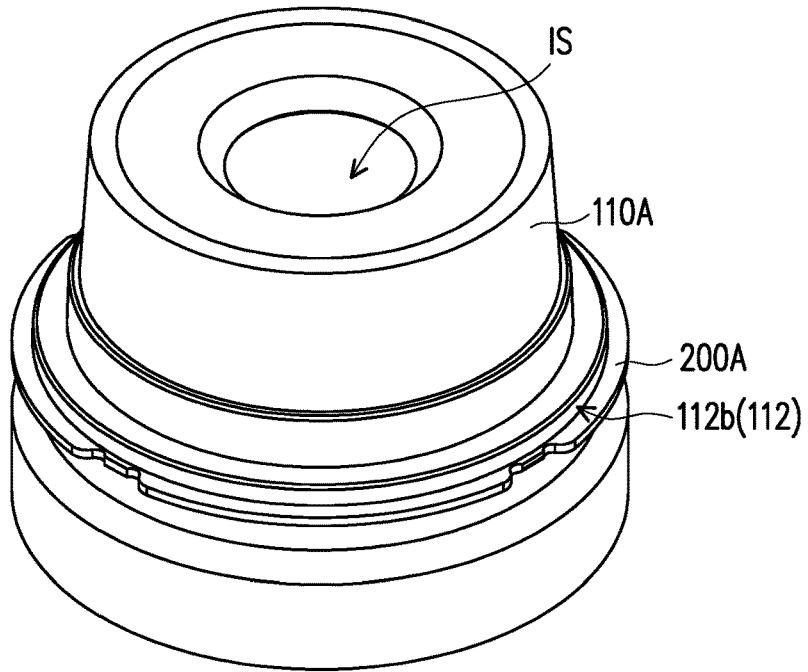
FIG. 3A is a schematic three-dimensional view of a lens barrel according to a second embodiment of the invention.
Figure 3B:
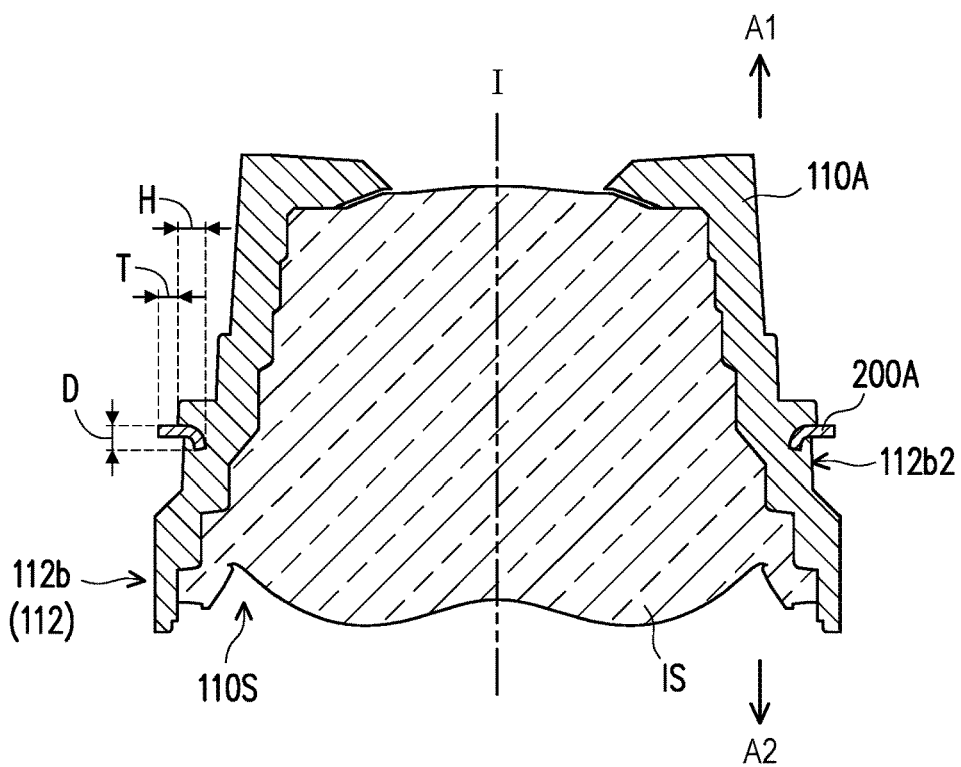
FIG. 3B is a schematic cross-sectional view of the lens barrel of the embodiment of FIG. 3A.

FIG. 3A is a schematic three-dimensional view of a lens barrel according to a second embodiment of the invention. FIG. 3B is a schematic cross-sectional view of the lens barrel of the embodiment of FIG. 3A. Referring to FIG. 3A and FIG. 3B, the lens barrel 110A of the embodiment is similar to the lens barrel 110 of FIG. 2A and FIG. 2B, and a main difference here between is as follows. The lens barrel 110A of the embodiment includes a sleeve 200A. Compared with the sleeve 200 of the first embodiment, the sleeve 200A has a shorter maximum length D in the direction parallel to the optical axis I. The sleeve 200A is fixed on the lens barrel outer surface 112b and is partially embedded in the barrel wall 112. In the embodiment, the lens barrel 110A may satisfy the conditional expression of 2.500≤S/D≤68.000, and the sleeve 200 does not extend beyond the lens barrel object-side surface 112b1 in the direction toward the object side A1, so as to achieve the purpose of reducing deformation of the lens barrel 110A and saving the costs, where 4.000≤S/D≤35.000 is the preferred range. Referring to FIG. 3B, a part of the sleeve 200A is embedded in the barrel wall 112 in the direction toward the optical axis I, and is then turned to extend toward a direction of the image side A2, but such extending direction is not limited thereto, where the sleeve 200A is embedded in the barrel wall 112 from the lens barrel external surface 112b2. The lens barrel external surface 112b2 may be a barrel-shaped surface around the optical axis I, or may be a tapered surface around the optical axis I that that gradually tapers toward the object side A1. The design of embedding a part of the sleeve in the barrel wall may enhance the bonding firmness between the sleeve and the barrel wall. In another embodiment, the part of the sleeve 200A that is exposed outside the lens barrel outer surface 112b may extend along the lens barrel outer surface 112b (for example, the exposed part extends in the direction toward the object side A1 along the lens barrel external surface 112b2), so as to enhance the bonding firmness between the sleeve and the barrel wall.

In the embodiment, the lens barrel 110A may satisfy a conditional expression: 0.010≤H/D≤15.800, where H is an embedding depth of the sleeve 200A in the direction perpendicular to the optical axis I, and D is the maximum length of the sleeve 200A in the direction parallel to the optical axis I, which enhances the bonding firmness between the sleeve and the barrel wall.

In addition, in the embodiment, the lens barrel 110A satisfies the following conditional expression: 0.000<T/D≤10.600, where T is a distance between a position of the sleeve 200A farthest from the optical axis I and the lens barrel outer surface 112b in the direction perpendicular to the optical axis I, and D is the maximum length of the sleeve 200A in the direction parallel to the optical axis I, which may achieve the purpose of mitigating the deformation of the lens barrel 110A while saving the cost. The lens barrel 110A of the embodiment may cooperate with an actuator similar to that shown in FIG. 1 to provide an imaging module.

Figure 4A:
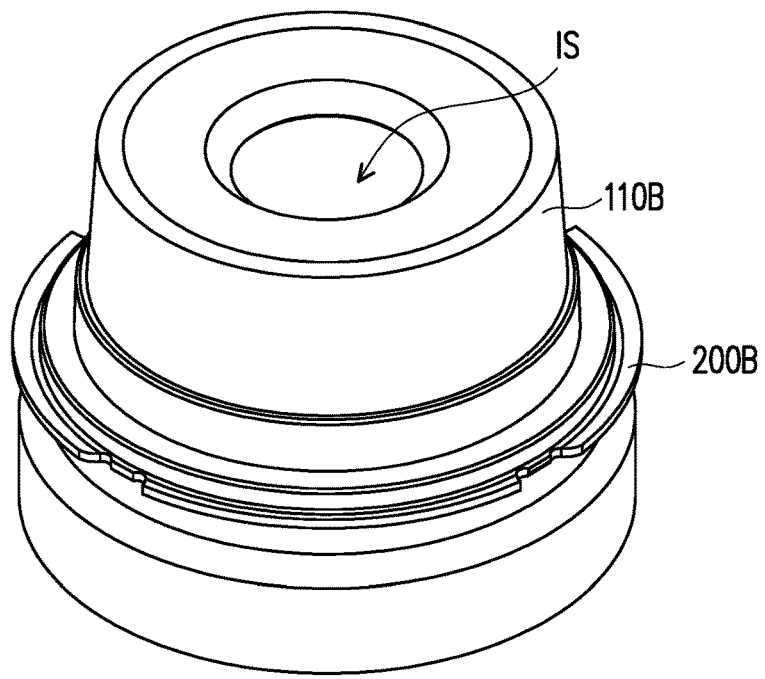
FIG. 4A is a schematic three-dimensional view of a lens barrel according to a third embodiment of the invention.
Figure 4B:
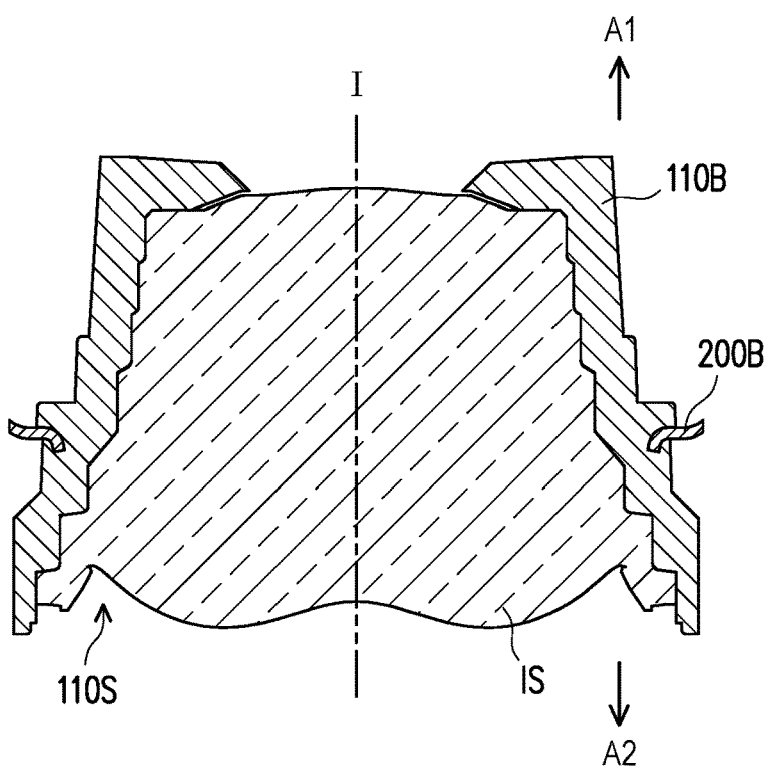
FIG. 4B is a schematic cross-sectional view of the lens barrel of the embodiment of FIG. 4A.

FIG. 4A is a schematic three-dimensional view of a lens barrel according to a third embodiment of the invention. FIG. 4B is a schematic cross-sectional view of the lens barrel of the embodiment of FIG. 4A. Referring to FIG. 4A and FIG. 4B, the lens barrel 110B of the embodiment is similar to the lens barrel 110A of FIG. 3A and FIG. 3B, and a main difference there between is as follows. The lens barrel 110B of the embodiment includes a sleeve 200B. Compared to the sleeve 200A of the second embodiment, the part of the sleeve 200B exposed to the outside of the lens barrel 110B is warped, and an end of the sleeve 200B that is farthest away from the optical axis I extends toward the object side A1. The lens barrel 110B of the embodiment may cooperate with an actuator similar to that shown in FIG. 1 to provide an imaging module.

Figure 5A:
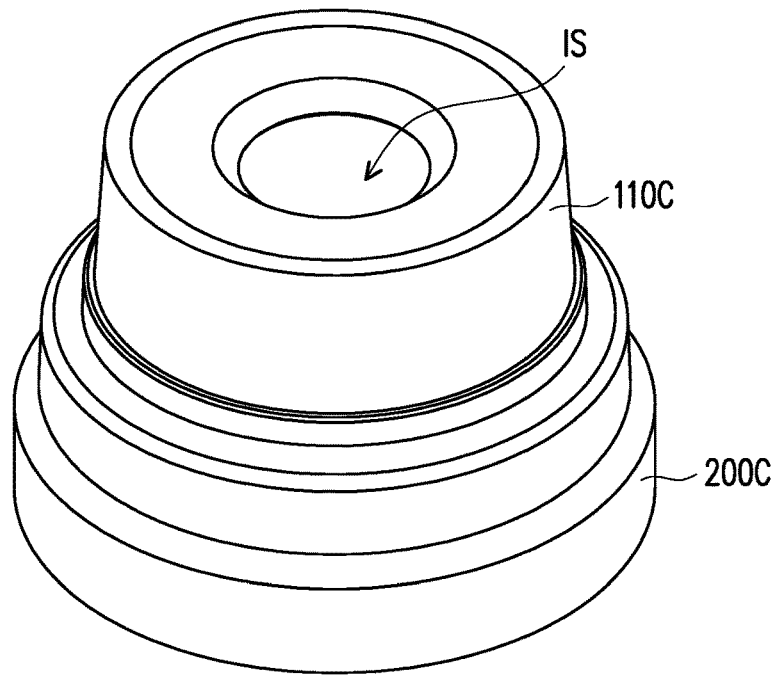
FIG. 5A is a schematic three-dimensional view of a lens barrel according to a fourth embodiment of the invention.
Figure 5B:
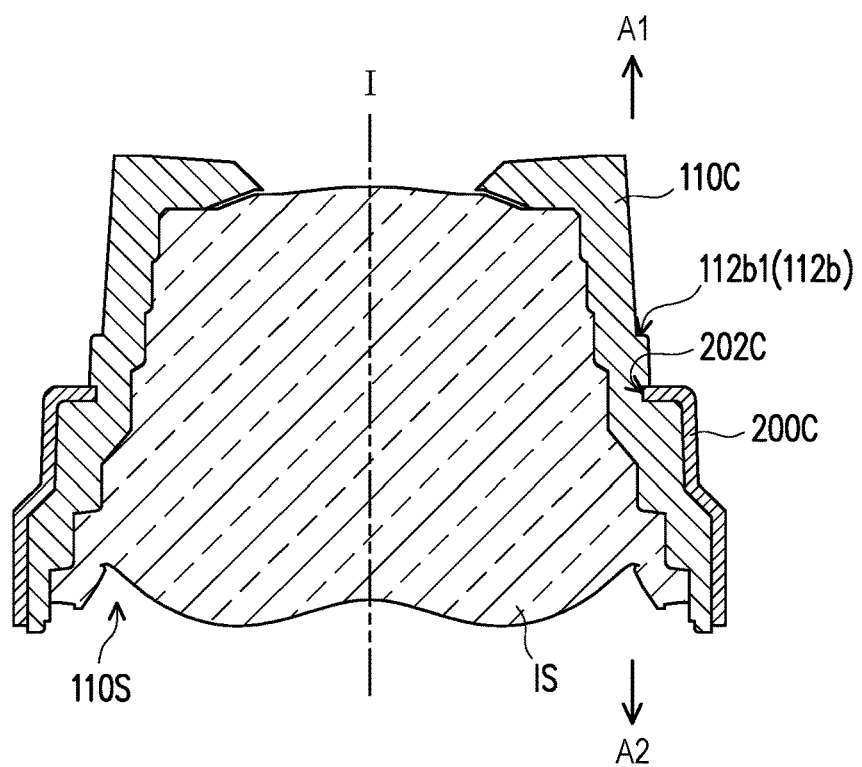
FIG. 5B is a schematic cross-sectional view of the lens barrel of the embodiment of FIG. 5A.

FIG. 5A is a schematic three-dimensional view of a lens barrel according to a fourth embodiment of the invention. FIG. 5B is a schematic cross-sectional view of the lens barrel of the embodiment of FIG. 5A. Referring to FIG. 5A and FIG. 5B, the lens barrel 110C of the embodiment is similar to the lens barrel 110 of FIG. 2A and FIG. 2B, and a main difference there between is as follows. The lens barrel 110C of the embodiment includes a sleeve 200C. Compared to the sleeve 200 of the first embodiment, the sleeve 200C covers at least one of a series of the lens barrel object-side surfaces 112b1. In the embodiment, an object-side end 202C of the sleeve 200C closest to the object side A1 does not extend beyond the lens barrel object-side surface 112b1 that is not covered by the sleeve 200C and closest to the object-side end 202C in the direction parallel to the optical axis I. The lens barrel 110C of the embodiment may cooperate with an actuator similar to that shown in FIG. 1 to provide an imaging module.

Figure 6A:
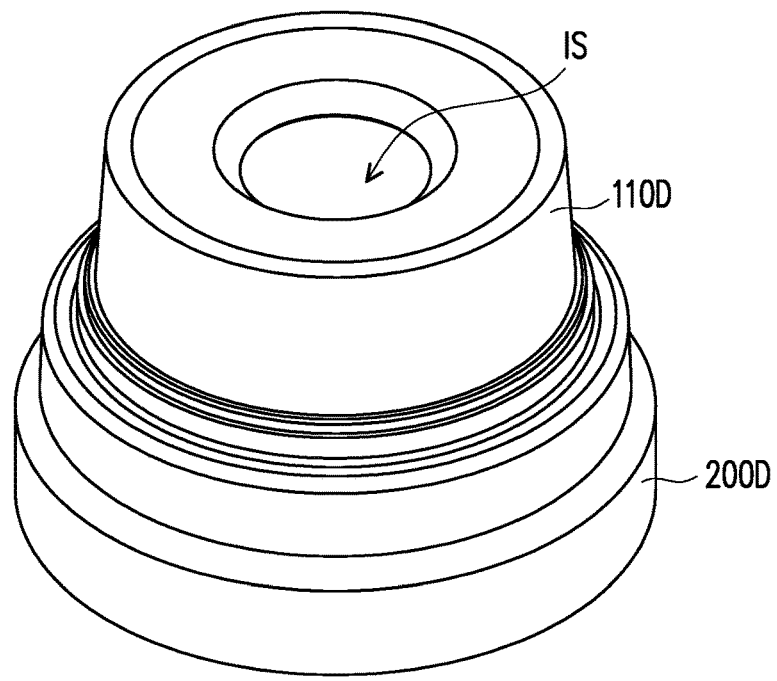
FIG. 6A is a schematic three-dimensional view of a lens barrel according to a fifth embodiment of the invention.
Figure 6B:
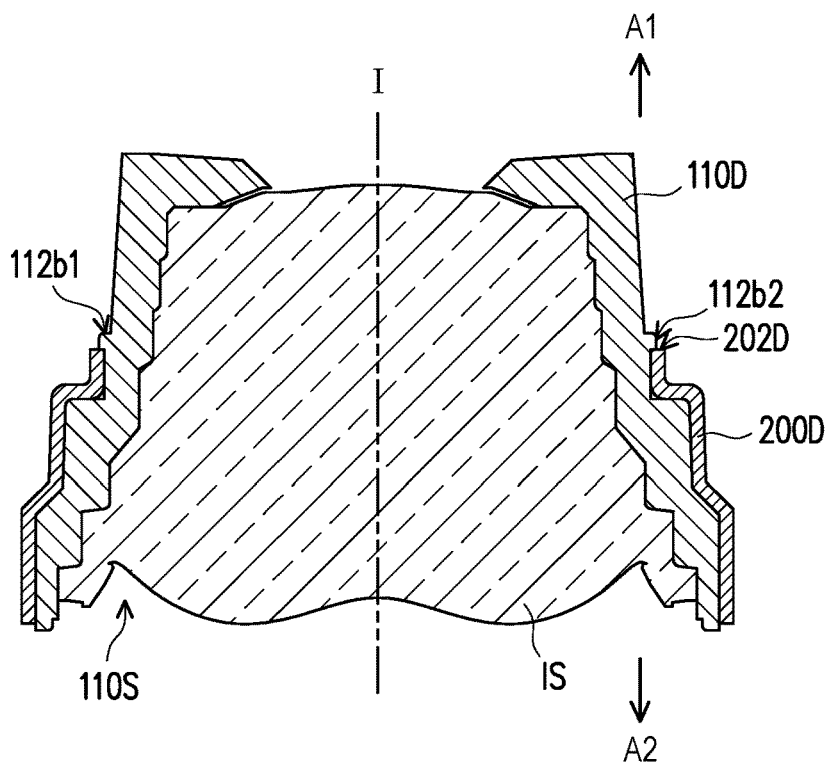
FIG. 6B is a schematic cross-sectional view of the lens barrel of the embodiment of FIG. 6A.

FIG. 6A is a schematic three-dimensional view of a lens barrel according to a fifth embodiment of the invention. FIG. 6B is a schematic cross-sectional view of the lens barrel of the embodiment of FIG. 6A. Referring to FIG. 6A and FIG. 6B, the lens barrel 110D of the embodiment is similar to the lens barrel 110 of FIG. 2A and FIG. 2B, and a main difference there between is as follows. The lens barrel 110D of the embodiment includes a sleeve 200D. Compared to the sleeve 200 of the first embodiment, the sleeve 200D covers at least one of a series of lens barrel object-side surfaces 112b1, and an object-side end 202D of the sleeve 200D closest to the object side A1 extends from the part of the sleeve 200D covering the lens barrel object-side surface 112b1 toward the object side A1 along the lens barrel external surface 112b2. In the embodiment, the object-side end 202D does not exceed beyond the lens barrel object-side surface 112b1 that is not covered by the sleeve 200D and closest to the object-side end 202D in the direction parallel to the optical axis I. The lens barrel 110D of the embodiment may cooperate with an actuator similar to that shown in FIG. 1 to provide an imaging module.

Figure 7:
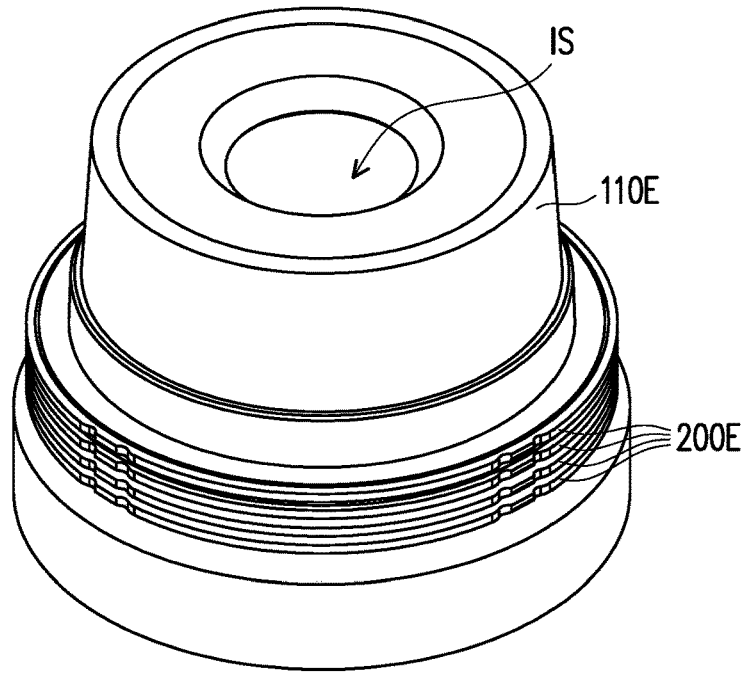
FIG. 7 is a schematic three-dimensional view of a lens barrel according to a sixth embodiment of the invention.

FIG. 7 is a schematic three-dimensional view of a lens barrel according to a sixth embodiment of the invention. Referring to FIG. 7, the lens barrel 110E of the embodiment is similar to the lens barrel 110A of FIG. 3A and FIG. 3B, and a main difference there between is as follows. The lens barrel 110E of the embodiment includes a sleeve 200E. Compared to the sleeve 200A of the second embodiment, the sleeve 200E includes four ring-shaped sleeves similar to the sleeve 200A. In some embodiments of the invention, the sleeve may include a plurality of ring-shaped sleeves. For example, the number of the sleeves may be less than or equal to four, so that the sleeves have the effect of mitigating deformation of the lens barrel while taking a manufacturing yield into consideration. But the invention is not limited thereto. The lens barrel 110E of the embodiment may cooperate with an actuator similar to that shown in FIG. 1 to provide an imaging module.

Figure 8:
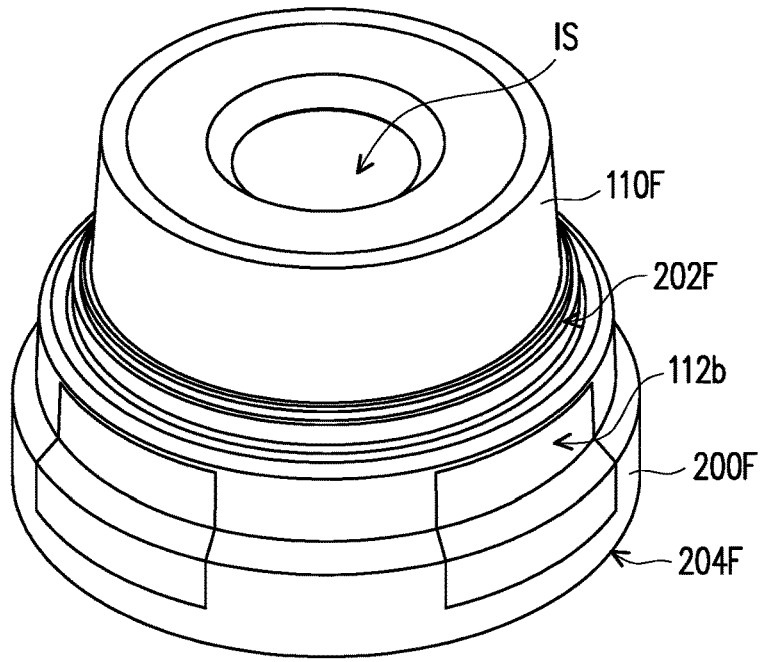
FIG. 8 is a schematic three-dimensional view of a lens barrel according to a seventh embodiment of the invention.

FIG. 8 is a schematic three-dimensional view of a lens barrel according to a seventh embodiment of the invention. Referring to FIG. 8, the lens barrel 110F of the embodiment is similar to the lens barrel 110D of FIG. 6A and FIG. 6B, and a main difference there between is as follows. The lens barrel 110F of the embodiment includes a sleeve 200F. Compared to the sleeve 200D of the fifth embodiment, the sleeve 200F presents a ring shape that discontinuously extends in a circumferential direction around the optical axis I, so that the sleeve has the effect of mitigating deformation of the lens barrel while taking a manufacturing yield into consideration. As shown in FIG. 8, a body of the sleeve 200F may be partially hollowed, but an object-side end 202F of the sleeve 200F closest to the object side A1 and an image-side end 204F closest to the image side A2 are still continuous without a break. The hollow part exposes the lens barrel outer surface 112b. The lens barrel 110F of the embodiment may cooperate with an actuator similar to that shown in FIG. 1 to provide an imaging module.

Figure 9:
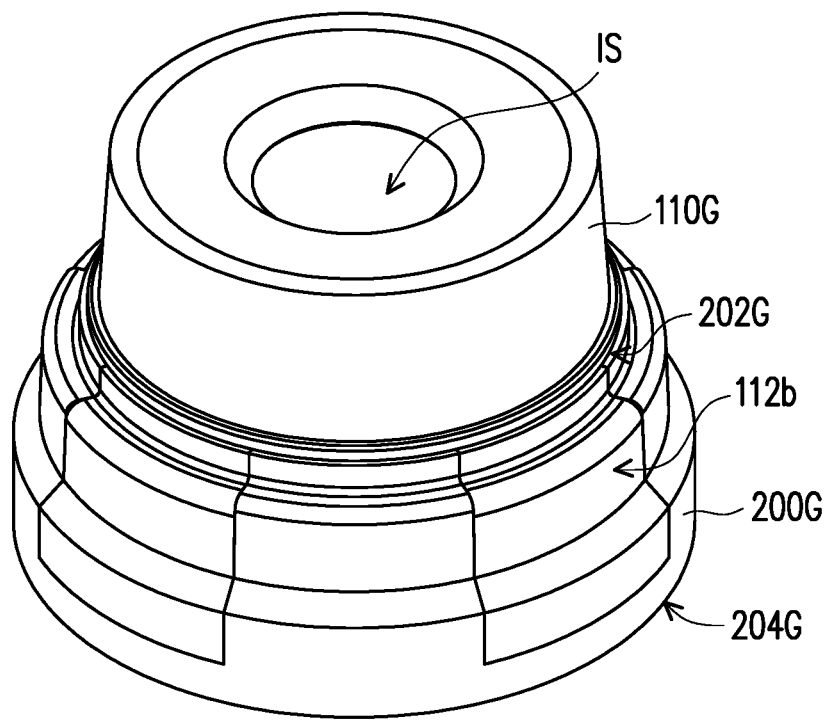
FIG. 9 is a schematic three-dimensional view of a lens barrel according to an eighth embodiment of the invention.

FIG. 9 is a schematic three-dimensional view of a lens barrel according to an eighth embodiment of the invention. Referring to FIG. 9, the lens barrel 110G of the embodiment is similar to the lens barrel 110D of FIG. 6A and FIG. 6B, and a main difference there between is as follows. The lens barrel 110G of the embodiment includes a sleeve 200G. Compared to the sleeve 200D of the fifth embodiment, the sleeve 200G presents a ring shape that discontinuously extends in a circumferential direction around the optical axis I, so that the sleeve has the effect of mitigating deformation of the lens barrel while taking a manufacturing yield into consideration. As shown in FIG. 9, a body of the sleeve 200G may be partially hollowed, and the hollow part may extend to the object-side end 202G of the sleeve 200G closest to the object side A1 in the direction toward the object side A1, so that the object-side end 202G has a discontinuous ring shape. However, the image-side end 204G of the sleeve 200G closest to the image side A2 is still continuous without a break. In other embodiments, the image-side end of the sleeve may also be completely broken, and presents a discontinuous ring shape. The hollow part exposes the lens barrel outer surface 112b. The lens barrel 110G of the embodiment may cooperate with an actuator similar to that shown in FIG. 1 to provide an imaging module.

The actuator may be fixed on the lens barrel outer surface, so that a portable electronic device may have a function of focusing or focus adjustment, and the actuator and the lens barrel have a better cooperating position. Regarding the lens barrel of the embodiment of the invention, by fixing the sleeve on the lens barrel outer surface and satisfying S/Lmax≥1.600, the sleeve may be set within the range of the better cooperating position to enhance a lens barrel strength within the cooperating range of the lens barrel and the actuator, so as to reduce the influence that the actuator on the lens barrel outer surface and the glue pull the lens barrel in a direction away from the optical axis, and achieve the purpose of mitigating deformation generated after the lens barrel and the actuator are bonded through dispensing and curing. A preferable range of S/Lmax is 1.600≤S/Lmax≤11.500, and a more preferable range is 2.000≤S/Lmax≤5.000. In addition, to fix the sleeve on the lens barrel outer surface may achieve a position limiting function, so that the sleeve is not easily eccentric when the lens barrel is molded. Besides, when the sleeve does not extend beyond the lens barrel object-side surface closest to the object-side end in the direction parallel to the optical axis, where the lens barrel object-side surface closest to the object-side end is closer to the object side than the image-side end, the firmness between the sleeve and the barrel wall of the lens barrel may be enhanced.

In the lens barrel of the embodiment of the invention, by fixing the sleeve on the lens barrel outer surface, the purpose of mitigating deformation generated after the lens barrel and the actuator are bonded through dispensing and curing may be achieved, when the conditional expression 2.500≤S/D≤68.000 is satisfied, the difficulty of bonding the sleeve with the lens barrel outer surface during molding of the lens barrel is reduced, and the cost may be saved. The sleeve is partially embedded in the barrel wall, and the sleeve does not extend beyond the lens barrel object-side surface closest to the object-side end in the direction parallel to the optical axis, where the lens barrel object-side surface closest to the object-side end is closer to the object side than the image-side end, which may enhance the firmness between the sleeve and the barrel wall of the lens barrel, and a preferable range is 4.000≤S/D≤35.000.

Regarding dispensing and bonding between the lens barrel and the actuator, the lens barrel and the actuator may be first expanded and then contracted during high temperature curing. At this time, pulling of the actuator on the lens barrel outer surface and the glue to the lens barrel in a radial direction away from the optical axis I may easily cause deformation of the lens barrel. The imaging module of the embodiment of the invention may mitigate the problem of deformation generated after the lens barrel and the actuator are bonded through dispensing and curing.

The embodiments of the invention may all be implemented, and a part of feature combination may be extracted from a same embodiment, the feature combination may also achieve unexpected effects of the invention compared with the prior art, and the feature combination includes but is not limited to a combination of lengths, distances, depths, conditional expressions, etc. The disclosure of the embodiment of the invention is a specific embodiment to illustrate the principle of the invention, and the invention should not be limited to the disclosed embodiments. Furthermore, the embodiments and the drawings are only for demonstrating the invention, and are not used for limiting the invention.

What is claimed is:

1. A lens barrel, comprising:
    a barrel wall, extending from an object side to an image side around an optical axis, wherein the barrel wall has a lens barrel inner surface facing the optical axis and a lens barrel outer surface facing away from the lens barrel inner surface, and the lens barrel outer surface comprises a lens barrel object-side surface facing the object side; and
    a sleeve, fixed on the lens barrel outer surface and partially embedded in the barrel wall, and having an object-side end closest to the object side and an image-side end closest to the image side, wherein the object-side end does not extend beyond the lens barrel object-side surface not covered by the sleeve and closest to the object-side end in a direction parallel to the optical axis, and the lens barrel object-side surface closest to the object-side end is closer to the object side than the image-side end; and
    the lens barrel satisfies a following conditional expression:

$$2.500 \leq S/D \leq 68.000,$$

where S is an overall length of the lens barrel along the optical axis, and D is a maximum length of the sleeve in the direction parallel to the optical axis,
    where a part of the sleeve outer surface and a part of the lens barrel outer surface are adapted to be a bonding surface.

2. The lens barrel as claimed in claim 1, wherein the lens barrel satisfies a following conditional expression: $0.010 \leq H/D \leq 15.800$, where H is an embedding depth of the sleeve in a direction perpendicular to the optical axis.

3. The lens barrel as claimed in claim 1, wherein a number of the sleeve is less than or equal to four.

4. The lens barrel as claimed in claim 1, wherein a material of the sleeve is metal.

5. The lens barrel as claimed in claim 1, wherein the sleeve is fixed on the lens barrel outer surface by means of an insert.

6. The lens barrel as claimed in claim 1, wherein the sleeve presents a ring shape discontinuously extending in a circumferential direction around the optical axis.

7. The lens barrel as claimed in claim 1, wherein the lens barrel satisfies a following conditional expression: $0.000 < T/D \leq 10.600$, where T is a distance between a position of the sleeve farthest from the optical axis and the lens barrel outer surface in a direction perpendicular to the optical axis.

8. The lens barrel as claimed in claim 1, wherein a material of the sleeve is a plastic material with a thermal expansion coefficient smaller than a thermal expansion coefficient of a material of the lens barrel.

9. A lens barrel, adapted to cooperate with an actuator, the lens barrel comprising:
    a barrel wall, extending from an object side to an image side around an optical axis, and having a lens barrel inner surface facing the optical axis and a lens barrel outer surface facing away from the lens barrel inner surface; and a sleeve, fixed on the lens barrel outer surface and having a sleeve inner surface facing the optical axis and a sleeve outer surface facing away from the sleeve inner surface, wherein a surface area of the sleeve outer surface is smaller than a surface area of the lens barrel outer surface; and the lens barrel satisfies a following conditional expression:

$S/Lmax \geq 1.600$, so that the sleeve is adapted to be set within a scope where the lens barrel cooperates with the actuator to reduce a deformation generated after dispensing and curing the lens barrel and the actuator;

where S is an overall length of the lens barrel along the optical axis, and Lmax is a distance between a position of the sleeve closest to the object side and a position of the lens barrel closest to the image side along a direction parallel to the optical axis, where a part of the sleeve outer surface and a part of the lens barrel outer surface are adapted to be a bonding surface.

10. The lens barrel as claimed in claim 9, wherein the barrel wall further has a lens barrel object-side surface facing the object side, the sleeve has an object-side end closest to the object side and an image-side end closest to the image side, the object-side end does not exceed beyond the lens barrel object-side surface not covered by the sleeve and closest to the object-side end in the direction parallel to the optical axis, and the lens barrel object-side surface closest to the object-side end is closer to the object side than the image-side end.

11. An imaging module, comprising:

a lens and an actuator, the lens comprising a lens barrel, and the lens barrel comprising:

a barrel wall, extending from an object side to an image side around an optical axis, wherein the barrel wall has a lens barrel inner surface facing the optical axis and a lens barrel outer surface facing away from the lens barrel inner surface; and a sleeve, fixed on the lens barrel outer surface and having a sleeve inner surface facing the optical axis and a sleeve outer surface facing away from the sleeve inner surface, wherein a surface area of the sleeve outer surface is smaller than a surface area of the lens barrel outer surface, and a part of the sleeve outer surface and a part of the lens barrel outer surface are bonded to a carrier of the actuator by dispensing and curing.

12. The imaging module as claimed in claim 11, wherein a material of the sleeve is metal.

13. The imaging module as claimed in claim 11, wherein the lens barrel satisfies a following conditional expression: $2.500 \leq S/D \leq 68.000$, where S is an overall length of the lens barrel along the optical axis, and D is a maximum length of the sleeve in a direction parallel to the optical axis.

14. The imaging module as claimed in claim 11, wherein the sleeve is fixed on the lens barrel outer surface by means of an insert.

15. The imaging module as claimed in claim 11, wherein the sleeve presents a ring shape discontinuously extending in a circumferential direction around the optical axis.

16. The imaging module as claimed in claim 11, wherein the lens barrel satisfies a following conditional expression: $0.000 < T/D \leq 10.600$, where T is a distance between a position of the sleeve farthest from the optical axis and the lens barrel outer surface in a direction perpendicular to the optical axis, and D is a maximum length of the sleeve in a direction parallel to the optical axis.

17. The imaging module as claimed in claim 11, wherein a number of the sleeve is less than or equal to four.

18. The imaging module as claimed in claim 11, wherein a material of the sleeve is a plastic material with a thermal expansion coefficient smaller than a thermal expansion coefficient of a material of the lens barrel.

* * * * *